United States Patent

[11] 3,565,143

[72] Inventor Georg Wehr
Rotenburg an der Fulda, Germany
[21] Appl. No. 742,910
[22] Filed July 5, 1968
[45] Patented Feb. 23, 1971
[73] Assignee Rotenburger Metallwerke GMBH
Rotenburg a.d. Fulda, Germany
[32] Priority July 5, 1967
[33] Germany
[31] R46410

[54] CHAIN CUTTER FOR DE-BRANCHING AND/OR DE-BARKING TREES
6 Claims, 12 Drawing Figs.

[52] U.S. Cl. .................................................. 144/208,
143/135, 144/2
[51] Int. Cl. ................................................... B27l
[50] Field of Search ........................................ 144/208,
2—21; 143/32, 135

[56] References Cited
UNITED STATES PATENTS

| | | | |
|---|---|---|---|
| 799,889 | 9/1905 | Bryan | |
| 1,937,073 | 11/1933 | Stuve | 144/208 |
| 2,713,276 | 7/1955 | Siverson | 143/135Y |
| 2,831,515 | 4/1958 | Potts | 144/208 |
| 2,948,311 | 8/1960 | McCollum | 145/32 |

Primary Examiner—Donald R. Schran
Attorney—Stevens, Davis, Miller & Mosher

ABSTRACT: A chain cutter for debranching and/or debarking trees in which the chain serves to carry cutter teeth and which lies, during operation, at least partly on the trunk being processed. A plurality of chain plates are mounted on the chain and provided with at least three differently shaped and ground cutter teeth. The teeth are arranged along the longitudinal axis of the chain in a repeating sequence of a spaced pair of teeth and a substantially centrally located single tooth. The spaced pair of teeth project outwardly beyond the sides of the chain.

CHAIN CUTTER FOR DE-BRANCHING AND/OR DE-BARKING TREES

The present invention relates to a chain cutter for debranching and/or debarking trees, especially conifers, in which a link chain serves as a carrier element for the cutter teeth arranged on the chain plates and lies, when operating, at least in part on the trunk being processed. At least three cutter teeth, differently shaped and ground, are provided in staggered relation to each other vertically relative to the longitudinal axis of the chain plates carrying the teeth. The cutting edges of the teeth project beyond the relevant chain plates and run approximately through the point of contact between the chain rollers adjacent the cutting edges and the trunk.

This invention relates to additional improvements to the chain cutter.

The chain cutter according to the present invention is characterized in that the inner tooth and the outer tooth of the chain are arranged on the same chain plate. This ensures symmetrical loading of the plate carrying the inner and outer teeth during cutting and eliminates any torque which might result in the shearing off of the pins holding the plates, or of the teeth themselves.

In another advantageous development of the invention, the chain pins may exhibit substantially the same diameter over their whole length. This further assists the symmetrical tooth arrangement on the tooth-carrying plate, since no notch effect can arise in the pins retaining the plates, as was formerly the case with chain pins having sections of reduced diameter at each end, on which the outer chain plates were seated.

It has also been found to be advantageous to make the central tooth of the chain cutter higher than the outer and inner teeth.

Similarly, in a further advantageous design of the invention, the inner, outer, and central teeth may have a side rake of about 15° and an upper clearance angle of about 10°. Moreover, the central teeth may be provided on both sides with a clearance angle of about 5°, as seen from the cutting edge towards the direction of travel, and the outer teeth may have, on the side remote from the trunk, a clearance angle of about 10° from the cutting edge to the base of the tooth and a clearance angle of about 5°, as seen from the cutting edge towards the direction of travel, while the inner teeth may be provided with a clearance angle of about 10°, as seen from the cutting edge towards the direction of travel, the inner and outer mm. on opposite sides having a clearance angle of about 2° 30', as seen from the cutting edge towards the direction of travel. The inner and outer teeth and the central teeth may project by about 8.7 mm. and about 11.7 mm., respectively, from the relevant chain plate. Furthermore the cutting edges of the inner teeth may be about 4.5 mm. in length, the cutting edges of the outer teeth may be about 5.5 mm. in length, and the cutting edges of the central teeth may be about 8 mm. in length.

Finally, as a result of a final feature of the invention, the outer chain plates on the side remote from the teeth may be provided with a central, outwardly projecting elevation, on which the chain cutter of the invention may be supported, during operation, on appropriate abutments on the apparatus in which they are used in order to ensure quiet running of the chain at relatively high feed velocities of the tree trunk being processed past the chain cutter.

The means for accomplishing the foregoing features and other advantages, which will be apparent to those skilled in the art, are set forth in the following specification and claims, and are illustrated in the accompanying drawings dealing with a basic embodiment of the present invention. Reference is made now to the drawings in which:

FIG. 12 shows a schematic view of a section taken along the line 12–12 of FIG. 1 through a chain located on a trunk.

Figure 1:
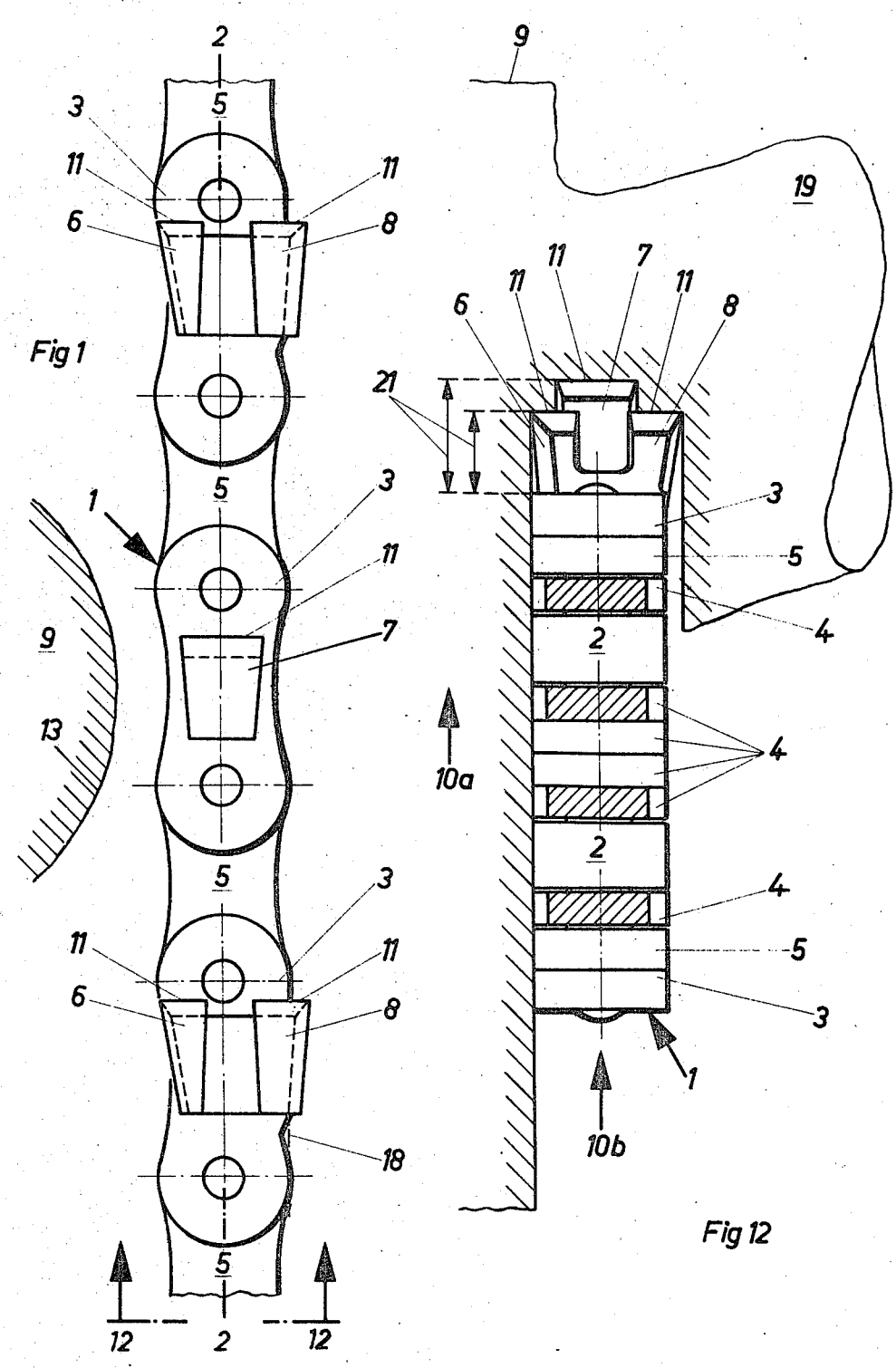
FIG. 1 is a schematic front view of a chain cutter according to the invention in the stretched condition.
Figure 2:
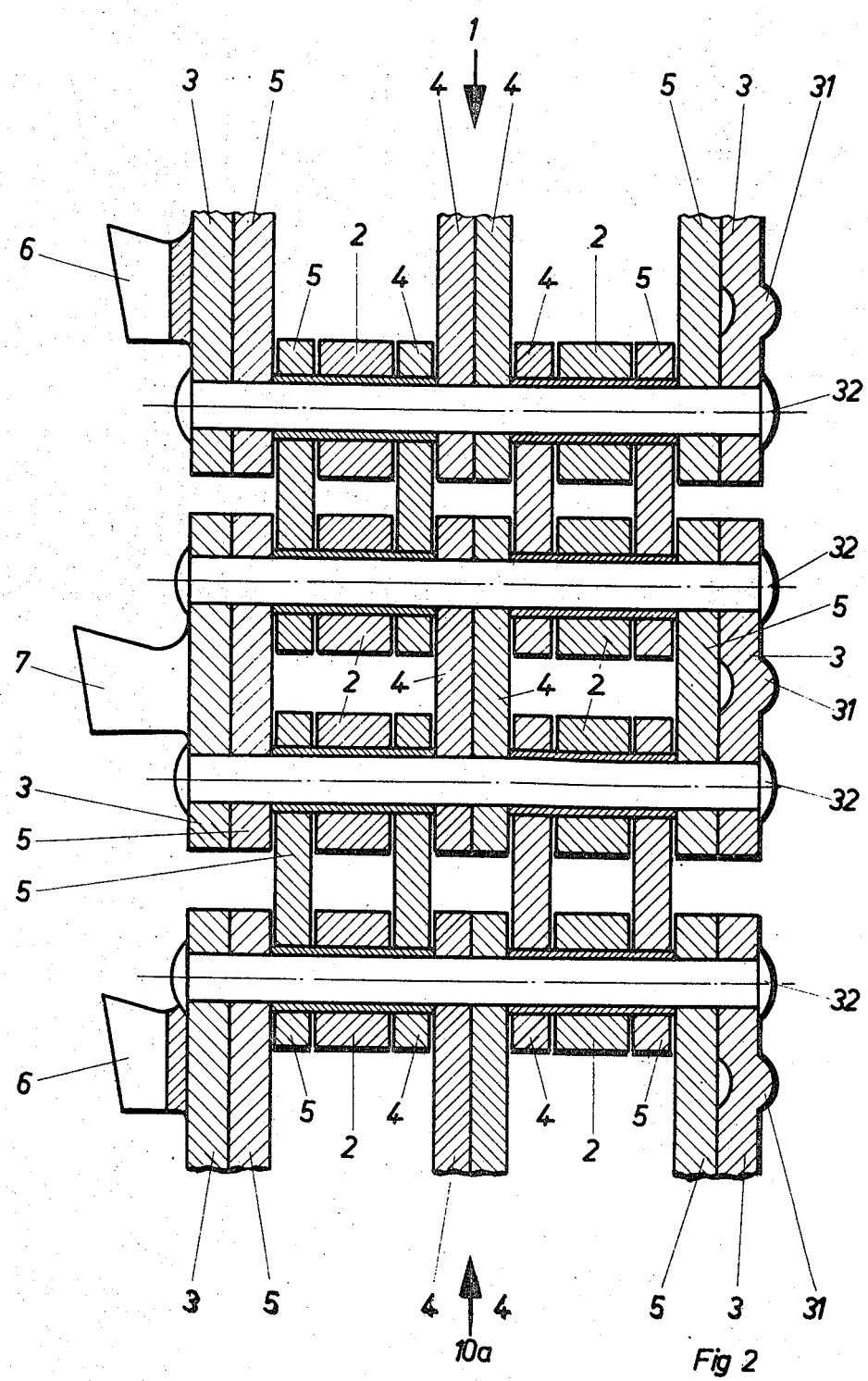
FIG. 2 is a section taken along line 2–2 in FIG. 1.
Figure 3:
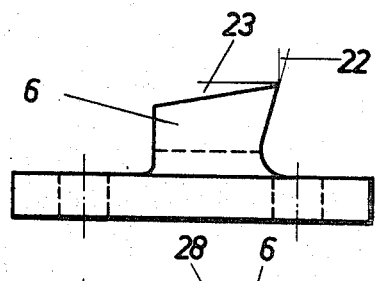
FIG. 3 to 5 show a side elevation, plan view, and an end elevation of a chain plate carrying an inner and an outer tooth.
Figure 4:
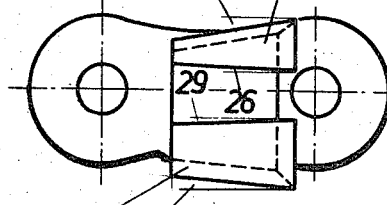
Figure 5:
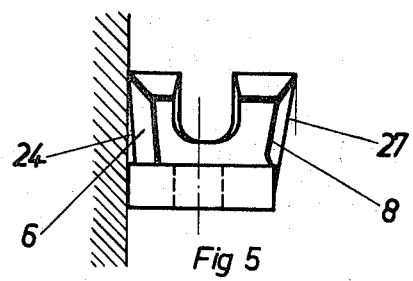
Figure 6:
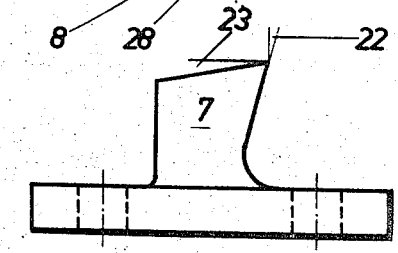
FIG. 6 to 8 show a side elevation, plan view, and an end elevation of a chain plate carrying a central tooth.
Figure 7:
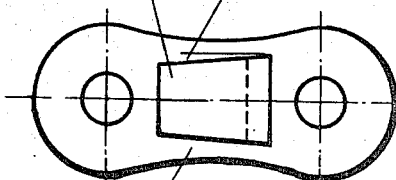
Figure 8:
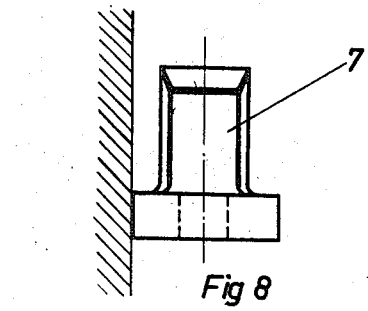
Figure 9:
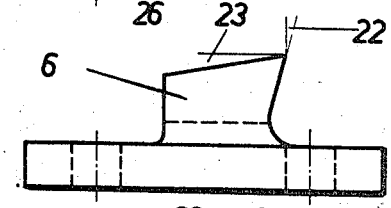
FIG. 9 to 11 show a side elevation, plan view, and an end elevation of an alternate tooth arrangement in which the outer tooth is arranged on the left-hand side and the inner tooth on the right-hand side of a single stud (as seen in the direction of travel)
Figure 10:
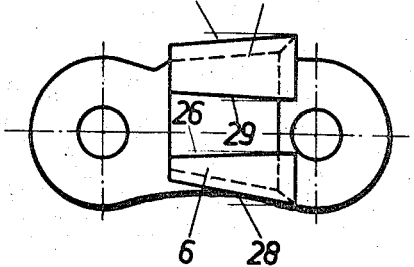
Figure 11:
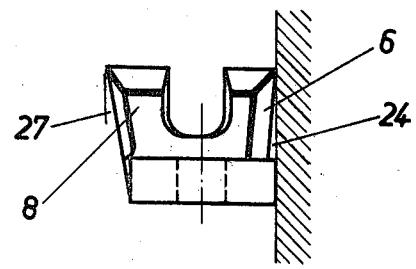

As may be seen from FIGS. 1, 2, and 12, the chain cutter 1 consists of a link chain serving as a carrier element and having roller elements 2, outer plates 3, inner plates 4, intermediate plates 5, and cutter teeth 6, 7, and 8. These are designed as block teeth and are arranged on outer plates 3 of one end face of the chain, each central tooth 7 being seated alone on a chain plate 3, while an outer and an inner tooth, 6 and 8, respectively, are arranged jointly on one plate 3.

During debranching and debarking, the chain cutter, shown stretched in FIG. 1, lies with its roller elements 2 on a section of trunk 9. The chain cutter 1 moves along trunk 9 in the direction arrow 10a (see FIGS. 1 and 2) and 10b (see FIG. 12). Teeth 6, 7, and 8 then penetrate with their cutting edges 11 into the bark on trunk 9 and remove it, without damaging the underlying wood.

Inner teeth 6 are arranged on their relevant plates 3 in such a manner that their cutting edges 11 run approximately through the point of contact between surface 13 of debarked trunk 9 and roller element 2, which is adjacent the cutting edge. The result of this is that even with different diameters of trunk periphery being processed by chain 11, inner teeth 6 are prevented from cutting into the surface 13 of trunk 9.

The cutting edges 11 of outer teeth 8 project beyond tangents 18 to the two relevant roller elements 2, as may be gathered from FIGS. 1 and 12. This prevents chain cutter 1 from being jammed when passing through a branch projection 19, which may occur particularly easily if, as shown in FIG. 12, the diameter of branch projection 19 is larger than the width of the chain. Outer teeth 8 project, with their cutting edges 11, on the side remote from the trunk, beyond the profile of roller elements 2 to cut chain 1 free thus ensuring unimpeded travel thereof.

It is important that outer and inner teeth 8 nd 6 be arranged in pairs on one plate 3, so that an inner tooth 6 is at the side of each outer tooth 8. This prevents the application of a torque to plate 3 during cutting thereby preventing the plates from being sheared clearance angle 23 of about the chain pins, still to be discussed, and preventing teeth 6 and 8 from being broken off plates 3. Pairs of teeth 6 and 8 are preferably machined from the same block, as may be gathered from FIGS. 1 and 12, and preferably have a height 21 of about 8.7 mm., while central teeth 7 are higher, exhibiting a height 21 of about 11.7 mm., as shown in FIG. 12.

It has been found of particular advantage to design cutter teeth 6, 7, and 8, to grind them, and to arrange them on plates 3 in the manner illustrated in FIGS. 3 to 11, the teeth 6, 7, and 8 having a side rake 22 of about 15° and an upper clearance angle 23 of about 10°. Furthermore, on the side facing trunk 9, inner teeth 6 are provided with a clearance angle 24 of about 5° from cutting edge 11 to the base of the tooth. Central teeth 7 exhibit on both sides a clearance angle 26 of about 5° from cutting edge 11, as seen towards the direction of travel. On the side remote from trunk 9, outer teeth 8 have a clearance angle 27 of about 10° from the cutting edge 11 to the base of the tooth and a clearance angle 28 of about 5° from cutting edge 11, as seen towards the direction of travel. On the side facing trunk 9, inner teeth 6 are furthermore provided with a clearance angle 28' of about 10°, as seen towards the direction of travel. Adjacent pairs of teeth 6 and 8 are finally provided, on the sides facing each other, with clearance angles 26' and 29' of about 2° 30' from the cutting edge, as seen towards the direction of travel.

The cutting edges of teeth 6, 7, and 8 have respective lengths of about 4.5, 8, and 5.5 mm.

Chain plates 3, arranged on the side of chain 1 remote from teeth 6, 7, and 8 are provided with a central, outwardly projecting elevation 31, which may be pressed into the plates 3, on which these plates may be supported on an abutment provided in the apparatus in which chain cutter 1 is used.

Finally, chain cutter 1 also includes chain pins 32, distinguished by the fact that they are of approximately the same diameter along their entire length. Thus no notch effects can arise in these pins.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore to be embraced therein.

I claim:

1. A chain cutter for use in devices which debranch and/or debark trees, particularly conifers, in which said chain, during operation, lies at least partly against the trunk being processed comprising a plurality of connected link means forming said chain, a plurality of chain plates mounted on one side of said chain, a plurality of at least three types of cutter teeth each type being differently shaped and ground, said teeth being integral with said plates and forming a staggered repeating sequence along the longitudinal axis of said chain of a spaced pair of teeth and a substantially centrally located single tooth, said pair of teeth being an inner tooth and an outer tooth and having one tooth of each of two of said types and said single tooth being of the third type of teeth, the cutting edges of said inner teeth projecting beyond their associated chain plates towards the trunk and running approximately through the point of contact between the chain adjacent the cutting edge and the trunk.

2. A chain cutter according to claim 1, in which the central tooth is higher than the outer and the inner teeth.

3. A chain cutter according to claim 1, in which the teeth exhibit a side rake of about 15° and an upper clearance angle of about 10°; said central tooth being provided on both sides with a clearance angle of about 5° from the cutting edge as seen towards the direction of travel; the outer tooth having, on the side remote from the trunk, a clearance angle of about 10° from the cutting edge to the base of the tooth and a clearance angle of about 5° from the cutting edge as seen towards the direction of travel; the inner tooth having, on the side facing the trunk, a clearance angle of about 5° from the cutting edge to the base of the tooth and a clearance angle of about 10° from the cutting edge, as seen towards the direction of travel; and the inner and outer teeth having, on the sides facing each other, clearance angles of about 2° 30' from the cutting edge, as seen towards the direction of travel.

4. A chain cutter according to claim 1, in which the inner and outer teeth project by about 8.7 mm., and the central tooth projects by about 11.7 mm. from the relevant chain plates.

5. A chain cutter according to claim 1, in which the cutting edge of the inner tooth is about 4.5 mm. in length, the cutting edge of the outer tooth is about 5.5 mm. in length, and the cutting edge of the central tooth is about 8 mm. in length.

6. A chain cutter according to claim 1, further comprising outer chain plates arranged on the side of the chain remote from the teeth, said outer chain plates being provided with a central, outwardly projecting elevation.